United States Patent [19]

Zeller, III et al.

[11] Patent Number: 5,520,902

[45] Date of Patent: May 28, 1996

[54] PROCESS FOR MAKING CHROMIUM-FREE ORTHORHOMBIC SODIUM SULFATE

[75] Inventors: Robert L. Zeller, III, Youngstown; Walter M. Opalinski, Tonawanda, both of N.Y.

[73] Assignee: Occidental Chemical Corporation, Niagara Falls, N.Y.

[21] Appl. No.: 345,956

[22] Filed: Nov. 25, 1994

[51] Int. Cl.$^6$ ............................ C01G 37/02; C01D 5/16; C01D 5/06

[52] U.S. Cl. .................. 423/551; 423/183; 423/607; 210/913

[58] Field of Search ................... 423/551, 182, 423/607; 210/913

[56] References Cited

U.S. PATENT DOCUMENTS

| | | | |
|---|---|---|---|
| 2,034,256 | 3/1936 | Vetter | 423/551 |
| 3,784,672 | 1/1974 | Morgan et al. | 423/607 |
| 4,168,240 | 9/1979 | Boekelmann et al. | 423/607 |
| 4,431,625 | 2/1984 | Marshal et al. | 423/551 |
| 4,636,376 | 1/1987 | Maioney et al. | 423/607 |
| 4,704,259 | 11/1987 | Lipstzajn | 423/607 |
| 4,773,974 | 9/1988 | Dubosz | 423/597 |
| 5,093,089 | 3/1992 | Alford et al. | 423/55 |
| 5,108,722 | 4/1992 | Ruthel et al. | 423/179 |

FOREIGN PATENT DOCUMENTS 63-135512  6/1988  Japan ........................ 423/551

OTHER PUBLICATIONS

Kirk–Othmer Encyclopedia of Chemical Technology, 3rd Edition, vol. 21, (1983), John Wiley & Sons p. 248.

*Primary Examiner*—Gary P. Straub
*Attorney, Agent, or Firm*—Richard D. Fuerle

[57] ABSTRACT

Disclosed is a process for making orthorhombic $Na_2SO_4$ containing less than 0.1 ppm chromium from a solution of $Na_2SO_4$ containing 0.1 to 100 ppm Cr(III). The Cr(III) is oxidized to Cr(VI) at a pH greater than 7, water is evaporated from the solution to precipitate the orthorhombic $Na_2SO_4$, and the precipitated orthorhombic $Na_2SO_4$ is separated from the solution.

20 Claims, 1 Drawing Sheet

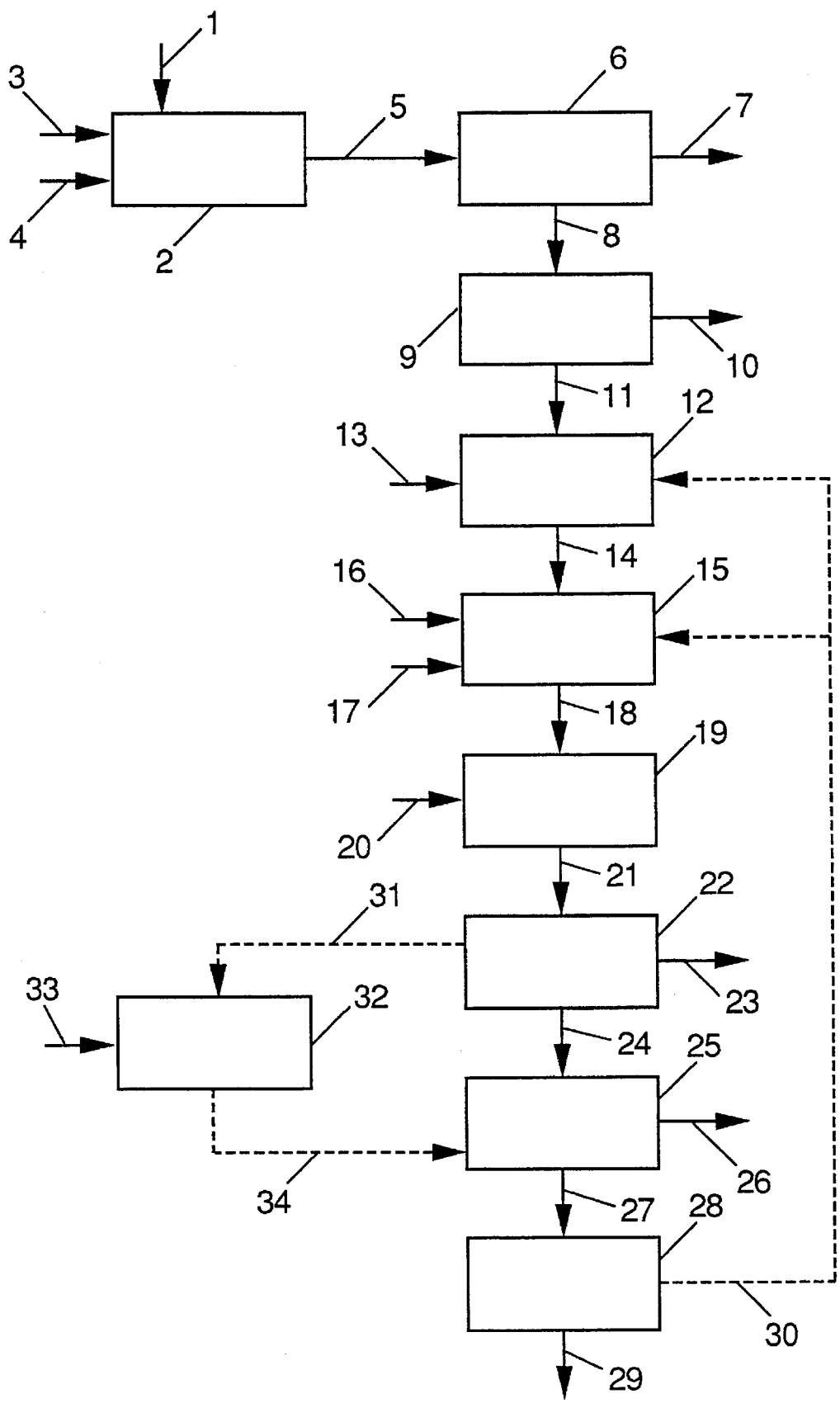

PROCESS FOR MAKING CHROMIUM-FREE ORTHORHOMBIC SODIUM SULFATE

BACKGROUND OF THE INVENTION

This invention relates to a process for making substantially chromium-free sodium sulfate from a solution thereof which contains 0.2 to 100 ppm Cr(III). (All references herein to chromium concentration are on a 100% $Na_2SO_4$ basis.) In particular, it relates to oxidizing Cr(III) in a sodium sulfate solution to Cr(VI) at a pH over 7, evaporating water from the solution to precipitate orthorhombic sodium sulfate, and separating the precipitated orthorhombic sodium sulfate from the solution.

When sodium bichromate is produced, salt cake (sodium sulfate, $Na_2SO_4$) is also made. This salt cake contains about 200 to about 1000 ppm Cr(VI). After the chromium has been removed from it the salt cake is useful in manufacturing glass and other products such as detergents. At the present time, chromium is removed from salt cake by reducing it to Cr(III) by adding sulfuric acid and $SO_2$. Sodium hydroxide is added which results in the precipitation of chromium hydroxide, $Cr(OH)_3$. The chromium hydroxide is separated from the solution and water is evaporated to precipitate the salt cake. However, this purified sodium sulfate still typically contains about 2.0 ppm Cr(III), which is undesirable to glass manufacturers because it imparts a green color to the glass and is undesirable to detergent manufacturers because of the slight green color.

SUMMARY OF THE INVENTION

We have discovered a modification of the current process for removing chromium from salt cake which results in salt cake containing almost undetectable (i.e., less than 0.2 ppm and usually less than 0.1 ppm) levels of chromium. We are able to virtually eliminate the presence of chromium from the salt cake by oxidizing the Cr(III) that remains in the solution after the removal of the $Cr(OH)_3$. Our invention is based on our discovery that although Cr(III) is absorbed into precipitating salt cake crystals, Cr(VI) will not enter into precipitating salt cake crystals if the concentration of Cr(VI) is less than about 100 ppm. This unexpected discovery has enabled us to produce chromium-free salt cake by oxidizing Cr(III) to Cr(VI) after $Cr(OH)_3$ removal, but before precipitating the salt cake.

BRIEF DESCRIPTION OF THE DRAWING

The accompanying drawing is a flow diagram that illustrates a certain presently preferred process for producing sodium bichromate from sodium chromate and for removing chromium from the salt cake byproduct solution, and illustrates how the present invention is an improvement upon that process.

DESCRIPTION OF THE PREFERRED EMBODIMENTS

In the drawing, a solution of sodium chromate ($Na_2CrO_4$) in line 1 is added to acidifier 2. When sulfuric acid from line 3 and sodium bisulfate from line 4 are added, sodium sulfate and sodium bichromate ($Na_2Cr_2O_7$) are produced. The solution of sodium bichromate passes through line 5 to evaporator 6 where water is evaporated, resulting in the precipitation of the sodium sulfate. The water is removed through line 7 and the slurry passes through line 8 to separator 9 where the solution of 69 to 92 wt % sodium bichromate is removed through line 10. The solid sodium sulfate is sent through line 11 to dissolver 12 where water is added from line 13 forming a solution of sodium sulfate, typically containing about 200 to about 1000 ppm Cr(VI), as well as a trace amount of Cr(III). The sodium sulfate solution is sent through line 14 to reduction tank 15 where sulfuric acid is added from line 16 and sulfur dioxide (or any suitable reducing agent) from line 17, reducing the Cr(VI) to Cr(III). The solution then passes through line 18 to precipitation tank 19 where sodium hydroxide is added from line 20, resulting in the formation of chromium hydroxide ($Cr(OH)_3$), which precipitates. The resulting slurry passes through line 21 to separator 22 and the precipitated chromium hydroxide is removed through line 23. The remaining solution of sodium sulfate, which typically contains less than 100 ppm of Cr(III), is passed through line 24 to evaporator 25. Water is evaporated through line 26 resulting in the precipitation of the sodium sulfate. The slurry of sodium sulfate is sent through line 27 to separator 28 which removes the precipitated sodium sulfate through line 29. All of the Cr(III) entering through line 24 enters the sodium sulfate product through line 29. Periodically, the mother liquor in separator 28 is recycled through line 30 to either dissolver 12 or reduction tank 15 to purge other impurities that build-up over time in the process.

In the improved process of this invention, the solution of sodium sulfate containing 0.2 to 100 ppm of Cr(III) is not sent through line 24 to evaporator 25. Instead, it passes through line 31 to oxidizing tank 32 where an oxidizer is added through line 33, oxidizing the Cr(III) to Cr(VI). The sodium sulfate solution, now containing Cr(VI) instead of Cr(III), is sent through line 34 to evaporator 25 where the water is evaporated and removed through line 26, which results in the precipitation of the sodium sulfate. The precipitated salt cake is sent through line 27 to separator 28 where it is removed (and sometimes washed) as product in line 29.

It is important to note that this precipitated salt cake in this invention is orthorhombic $Na_2SO_4$ and is not monoclinic sodium decahydrate, $Na_2SO_4.10H_2O$, also known as Glauber's salt. Monoclinic Glauber's salt is known to reject most impurities when it crystallizes from solution, unlike orthorhombic sodium sulfate, which is known to have an affinity for impurities when it is crystallized in solution. See Kirk-Othmer Encyclopedia of Chemical Technology, Third Edition, Volume 21 (1983) page 249. Thus, it is more difficult to prepare pure orthorhombic sodium sulfate than it is to prepare pure monoclinic sodium sulfate decahydrate.

In certain applications, such as the preparation of green glass, it may be desirable to remove only part of the chromium that would otherwise be present in the salt cake. This can be accomplished by adding less oxidizer so that some of the Cr(III) is not oxidized to Cr(VI) and is absorbed into the salt cake when it precipitates.

Any oxidizer that can oxidize Cr(III) to Cr(VI) in aqueous solution can be used in the process of this invention. Examples of suitable oxidizers include air, ozone, and peroxides such as sodium persulfate and sodium percarbonate. Air, which can be sparged into the solution, is the preferred oxidizer as it is inexpensive, safe, easy to use, and environmentally acceptable. Excess oxidizer is normally used unless it is desirable to produce a salt cake containing some chromium. Oxidation is performed at a pH greater than 7 and a pH of about 9 is typical. Usually, it will not be necessary to adjust the pH, but if it is this can be easily accomplished using, for example, sodium hydroxide.

We have found that if the concentration of Cr(VI) is too high (e.g., 1000 ppm) the salt cake will absorb the Cr(VI)

when it precipitates. In order to successfully produce salt cake containing less than 0.2 ppm chromium, it is therefore necessary to reduce the chromium concentration in the sodium sulfate solution being treated to less than 100 ppm and preferably to less than 10 ppm. Fortunately, this is easily accomplished by the precipitation of chromium hydroxide as described hereinabove.

The following examples further illustrate this invention.

EXAMPLE 1

Reagent grade $Na_2SO_4$ (1400 g) was dissolved in 3600 g of deionized $H_2O$ at 60° C. Sodium bichromate, $Na_2Cr_2O_7.2H_2O$, (0.15 g) was added to obtain a solution containing approximately 37 ppm Cr(VI). The pH was adjusted to approximately 9 with a few drops of 50% NaOH. The solution (3175.27 g) was placed into an evaporator and was heated under 28" $H_2O$ vacuum. Condensed water (1772.46 g) was removed and $Na_2SO_4$ crystals crystallized in the evaporator. The slurry in the evaporator was filtered and the salt cake collected. The weight of the wet salt cake collected was 726.4 g and, after drying at 60° C. the weight was 651.0 g. The filtrate weight, which contained 132 ppm Cr(VI), was 676.41 g. The unwashed dry salt cake contained 6.7 ppm Cr(VI). By mass balance, all of the Cr(VI) in the $Na_2SO_4$ was present due to entrained mother liquor.

mately 6 with a few drops of 98% $H_2SO_4$ in order to keep the Cr(III) dissolved in solution. The solution (5678.27 g) was placed in an evaporator and was heated under 28" $H_2O$ vacuum. Condensed water (3715.10 g) was removed and $Na_2SO_4$ crystals crystallized in the evaporator. The slurry in the evaporator was filtered and the salt cake collected at approximately 60° C. The weight of the wet cake collected was 1416.61 g and, after drying at 60° C., the weight was 1364.98 g. The filtrate weight was 546.56 g, which contained 2.5 ppm Cr(III). The pH of the filtrate did not change significantly from 6. The unwashed dry cake contained 54 ppm Cr(III). By mass balance, all of the Cr(III) entering the evaporator with the feed was incorporated into the $Na_2SO_4$ crystal.

| Solution | Wt % | % $Na_2SO_4$ | ppm Cr | g Cr | Cr in ML | g in cake | % Cr |
|---|---|---|---|---|---|---|---|
| In Feed | 3175.27 | 27.00 | 37 | 0.0317 | | | 100.0 |
| Out Condensate | 1772.46 | 0.00 | 0 | 0.0000 | | | |
| Out Wet Cake | 726.40 | 89.62 | | | | | |
| Out Dry Cake | 651.03 | 100.00 | 6.7 | 0.0044 | 0.0044 | −0.0000 | −0.0 |
| Out Filtrate | 676.41 | 30.50 | 132 | 0.03 | | | 100.0 |
| Total Mass Balance (In-Out)/In | | | | | 0.00% | | |
| $Na_2SO_4$ Balance (In-Out)/In | | | | | 0.00% | | |
| Cr Balance (In-Out)/In | | | | | 0.40% | | |

This example shows that trace quantities of Cr(VI) do not become incorporated into the $Na_2SO_4$ crystals during crystallization.

| Solution | Wt % | % $Na_2SO_4$ | ppm Cr | g Cr | Cr in ML | g in cake | % Cr |
|---|---|---|---|---|---|---|---|
| In Feed | 5678.27 | 27.00 | 44 | 0.0675 | | | 100.0 |
| Out Condensate | 3715.10 | 0.00 | 0 | 0.0000 | | | |
| Out Wet Cake | 1416.61 | 96.36 | | | | | |
| Out Dry Cake | 1364.98 | 100.00 | 54 | 0.737 | 0.0001 | 0.0737 | 99.4 |
| Out Filtrate | 546.56 | 30.77 | 2.5 | 0.0004 | | | 0.6 |
| Total Mass Balance (In-Out)/In | | | | | −0.00% | | |
| $Na_2SO_4$ Balance (In-Out)/In | | | | | 0.00% | | |
| Cr Balance (In-Out)/In | | | | | −9.89% | | |

EXAMPLE 2

Reagent grade $Na_2SO_4$ (1620 g) was dissolved in 4380 g of deionized $H_2O$ at 60° C. Chromic chloride, $CrCl_3.6H_2O$, (0.369 g) was added to obtain a solution containing approximately 44 ppm Cr(III). The pH was adjusted to approxi- This example shows that trace quantities of Cr(III) become incorporated into the $Na_2SO_4$ crystal during crystallization.

EXAMPLE 3

Reagent grade $Na_2SO_4$ (560 g) was dissolved in 1440 g of deionized $H_2O$ at 60° C. Sodium bichromate (1.61 g) was added to obtain a solution containing approximately 1000 ppm Cr(VI). The pH was adjusted to approximately 9 with a few drops of 50% NaOH. The solution (1976.9 g) was placed in an evaporator and was heated under 28" $H_2O$ vacuum. Condensed water (1122.9 g) was removed and $Na_2SO_4$ crystals crystallized in the evaporator. The slurry in the evaporator was filtered and the salt cake collected. A portion of the salt cake was extensively washed with isopropyl alcohol. The weight of the wet salt cake collected was 451.6 g and, after drying at 60° C., the weight was 446.0 g. The filtrate weight was 345.7 g, which contained 4558 ppm Cr(VI). The unwashed dry salt cake contained 80 ppm Cr(VI). By mass balance, 5% of the Cr(VI) entering the evaporator with the feed was incorporated into the $Na_2SO_4$ crystal. Wet salt cake extensively washed with isopropyl alcohol had 60 ppm Cr(VI).

| Solution | Wt % | % $Na_2SO_4$ | ppm Cr | g Cr | Cr in ML | g in cake | % Cr |
|---|---|---|---|---|---|---|---|
| In Feed | 1976.90 | 28.00 | 1000 | 0.5535 | | | 100.0 |
| Out Condensate | 1122.90 | 0.00 | 0 | 0.0000 | | | |
| Out Wet Cake | 451.60 | 98.76 | | | | | |
| Out Dry Cake | 446.00 | 100.00 | 80 | 0.0357 | 0.0115 | 0.0242 | 4.6 |
| Out Filtrate | 345.70 | 31.11 | 4558 | 0.4901 | | | 95.4 |
| Total Mass Balance (In-Out)/In | | | | | 2.87% | | |
| $Na_2SO_4$ Balance (In-Out)/In | | | | | 0.00% | | |
| Cr Balance (In-Out)/In | | | | | 5.01% | | |

This example shows that higher trace quantities of Cr(VI) become incorporated into the $Na_2SO_4$ crystal during crystallization.

EXAMPLE 4

Seventy gallons of a 27% $Na_2SO_4$ solution containing 0.26 ppm Cr(VI) and <0.11 ppm Cr(III) were prepared by: (1) dissolving $Na_2SO_4$ containing 300 ppm Cr(VI) at 60° C.; (2) adjusting the pH of the solution to 2 with 98% $H_2SO_4$; (3) adding 40% $NaHSO_3$ to reduce the Cr(VI) to Cr(III); (4) adding 50% NaOH to a pH of 8.8 to precipitate $Cr(OH)_3$; (5) filtering the solution to remove the $Cr(OH)_3$; and (6) allowing air oxidation to convert the residual Cr(III) to Cr(VI). The solution (28.6 kg) was evaporated, and condensate ($H_2O$) and wet salt cake were periodically removed. The wet cake was removed in 400 g batches by periodically centrifuging the slurry, and dried. The salt cake was not washed. A total of 18.7 kg of condensate ($H_2O$) and 7.9 kg of $Na_2SO_4$ were collected. The final concentrate, weighing 1.9 kg, contained 0.88 ppm Cr(VI). All $Na_2SO_4$ samples collected over the duration of the test contained <0.1 ppm Cr(VI) and <0.1 ppm Cr(total). This example shows that Cr(VI) oxidized from Cr(III) will not incorporate into the $Na_2SO_4$ crystal at trace levels.

We claim:

1. A process for making orthorhombic $Na_2SO_4$ containing less than 0.2 ppm chromium from a solution of $Na_2SO_4$ in water containing 0.1 to 100 ppm Cr(III), comprising oxidizing said Cr(III) in said solution to Cr(VI) at a pH greater than 7, evaporating water from said solution to precipitate said orthorhombic $Na_2SO_4$, and separating said precipitated orthorhombic $Na_2SO_4$ from said solution.

2. A process according to claim 1 including the additional last step of washing said precipitated orthorhombic $Na_2SO_4$.

3. A process according to claim 1 wherein the concentration of Cr(III) in said aqueous solution is less than 10 ppm.

4. A process according to claim 1 wherein said oxidizing is at a pH of about 9.

5. A process according to claim 1 wherein air is used to perform said oxidizing.

6. A process according to claim 1 wherein said solution of $Na_2SO_4$ in water containing 0.1 to 100 ppm Cr(III) is produced by reducing the Cr(VI) in an aqueous solution of $Na_2SO_4$ containing 300 to 1000 ppm Cr(VI) to Cr(III), adding sodium hydroxide to said aqueous solution to precipitate said Cr(III) as $Cr(OH)_3$, separating said precipitated $Cr(OH)_3$ from said aqueous solution, evaporating water from said aqueous solution to precipitate said $Na_2SO_4$, washing said precipitated $Na_2SO_4$, and dissolving said precipitated $Na_2SO_4$ in water.

7. In a process for removing chromium from sodium sulfate wherein Cr(VI) in an aqueous solution of sodium sulfate containing 300 to 1000 ppm Cr(VI) is reduced to Cr(III), said Cr(III) is precipitated as $Cr(OH)_3$, said precipitated $Cr(OH)_3$ is separated from said solution, and water in said solution is evaporated to precipitate sodium sulfate, the improvement which comprises, after said $Cr(OH)_3$ has been separated from said solution and before water in said solution is evaporated to precipitate sodium sulfate, oxidizing any Cr(III) remaining in said solution to Cr(VI).

8. A process according to claim 7 including the additional last step of washing said precipitated salt cake.

9. A process according to claim 7 wherein the concentration of Cr(III) in said solution after the separation of $Cr(OH)_3$ therefrom is 0.1 to 100 ppm.

10. A process according to claim 7 wherein the concentration of Cr(III) in said solution after the separation of $Cr(OH)_3$ therefrom is 0.1 to 10 ppm.

11. A process according to claim 7 wherein said oxidizing is at a pH of about 9.

12. A process according to claim 7 wherein said Cr(VI) is reduced to Cr(III) using sulfuric acid and sulfur dioxide.

13. A process according to claim 7 wherein air is used to perform said oxidizing.

14. A process according to claim 7 wherein said aqueous solution of sodium sulfate is produced by treating an aqueous solution of sodium chromate with sulfuric acid, sodium bisulfate, or a mixture thereof to produce sodium bichromate, evaporating water to precipitate sodium sulfate cake, and separating said precipitated sodium sulfate from said aqueous solution of sodium sulfate.

15. A process according to claim 7 wherein, after precipitation of said sodium sulfate, said aqueous solution is recycled to be reduced to Cr(III).

16. A process for making orthorhombic $Na_2SO_4$ containing less than 0.1 ppm chromium from a solution of $Na_2SO_4$ in water containing 0.1 to 10 ppm Cr(III) comprising (A) sparging air through said solution at a pH of said solution over 7 to oxidize said Cr(III) in said solution to Cr(VI);

(B) evaporating water from said solution to precipitate said orthorhombic $Na_2SO_4$; and (C) separating said precipitated orthorhombic $Na_2SO_4$ from said solution.

17. A process according to claim 16 including the additional last step of washing said precipitated orthorhombic $Na_2SO_4$.

18. A process according to claim 16 wherein said oxidizing is at a pH of about 9.

19. A process according to claim 16 wherein said solution of $Na_2SO_4$ in water containing 0.1 to 10 ppm Cr(III) is produced by reducing the Cr(VI) in an aqueous solution of $Na_2SO_4$ containing 300 to 1000 ppm Cr(VI) to Cr(III), adding sodium hydroxide to said aqueous solution to precipitate said Cr(III) as $Cr(OH)_3$, separating said precipitated $Cr(OH)_3$ from said aqueous solution, evaporating water as from said aqueous solution to precipitate said $Na_2SO_4$, washing said precipitous $Na_2SO_4$, and dissolving said precipitated $Na_2SO_4$ in water.

20. A process according to claim 19 wherein said Cr(VI) is reduced to Cr(III) using sulfuric acid and sulfur dioxide.

\* \* \* \* \*